A. M. CONDIT.
ELECTRIC SWITCH.
APPLICATION FILED NOV. 10, 1919.
1,369,622.
Patented Feb. 22, 1921.
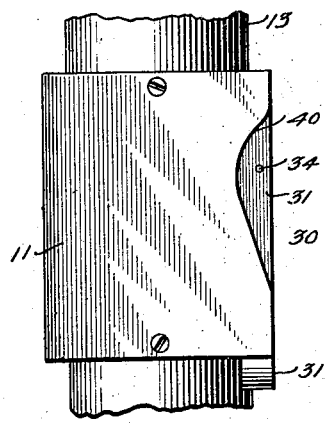
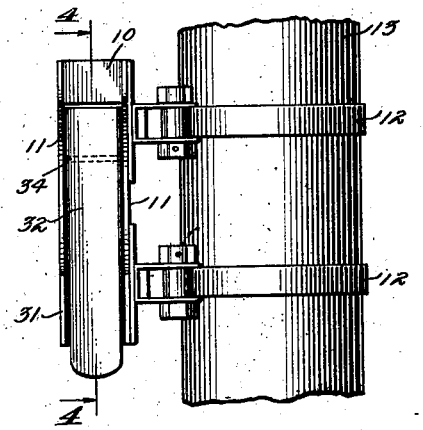
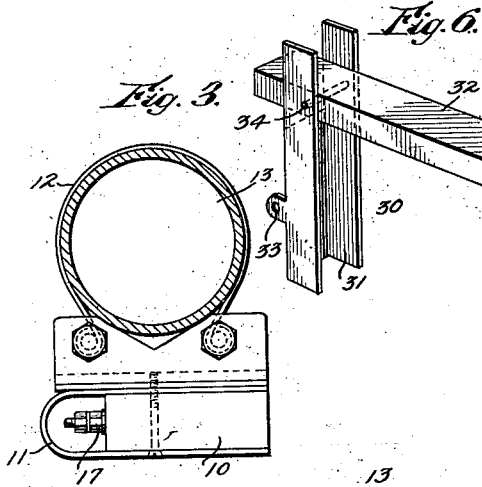
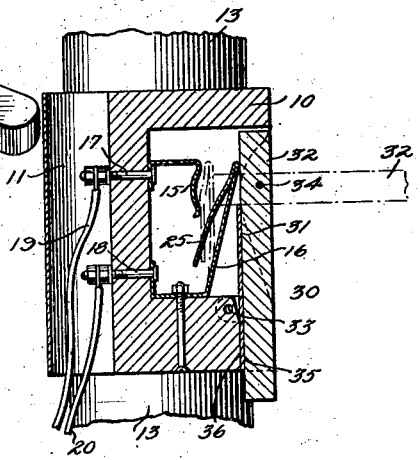
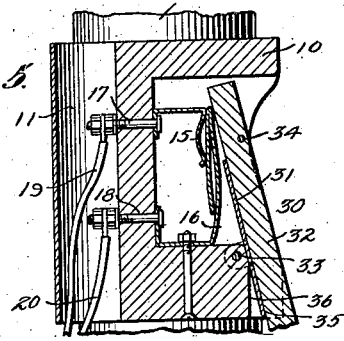
INVENTOR
ARTHUR M. CONDIT.
BY
ATTORNEYS

UNITED STATES PATENT OFFICE.

ARTHUR M. CONDIT, OF EAST ORANGE, NEW JERSEY.

ELECTRIC SWITCH.

1,369,622.  Specification of Letters Patent.  Patented Feb. 22, 1921.

Application filed November 10, 1919. Serial No. 336,945.

*To all whom it may concern:*

Be it known that I, ARTHUR M. CONDIT, a citizen of the United States, and a resident of East Orange, in the county of Essex and State of New Jersey, have invented a new and Improved Electric Switch, of which the following is a full, clear, and exact description.

The object of the invention is to provide a new and improved electric switch arranged to permit of conveniently closing an electric circuit temporarily or for any length of time according to the desires of the user, and without requiring attention for the time being on the part of the user.

Another object is to provide an electric switch which is very serviceable for use in signaling devices employed on automobiles for giving a desired signal to a following vehicle, such switch being located on the steering post or steering post column and hence under the control of the operator in charge of the automobile to enable the operator to temporarily display a signal or to keep it displayed for a desired length of time.

Another object is to permit of conveniently attaching the electric switch to a desired support.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side view of the improved electric switch as applied to the steering column of an automobile;

Fig. 2 is an edge view of the same;

Fig. 3 is a plan view of the same with the column shown in section;

Fig. 4 is a sectional side elevation of the improved electric switch on the line 4—4 of Fig. 2;

Fig. 5 is a similar view of the same with the switch lever pressed to temporarily close the electric circuit; and Fig. 6 is a perspective view of the switch lever.

The casing or frame 10 of the electric switch is made of a suitable material and is held in a U-shaped shell 11 adapted to be fastened by bands 12 to the column 13 of the steering post of an automobile to support the electric switch within convenient reach of the operator in charge of the automobile. In the casing or frame 10 are secured contacts 15 and 16, preferably of the spring type, and of which the contact 15 is the fixed one and the other contact 16 is the movable one and is normally out of engagement with the fixed contact 15. The contacts 15 and 16 are connected in the usual manner with binding posts 17, 18 arranged on one side of the casing or frame 10 and to which the circuit wires 19 and 20 are secured. The contact 16 is provided with a spring tongue 25 adapted to engage the fixed contact 15 on pressing the contact 16 inwardly, as indicated in Fig. 5, and in dotted lines in Fig. 4.

The movable contact 16 is controlled by a switch lever 30 comprising two members 31 and 32, of which the member 31 is the carrying member and is fulcrumed at 33 on the casing or frame 10. The other member 32 is a switch closing member and is fulcrumed at 34 on the carrying member 31 near the free end thereof. The switch lever 30 extends within the open right-hand side side of the casing or frame 10, and the back of the closing member 32 is normally pressed on by the free end of the spring contact 16 to hold the closing member 32 folded upon the carrying member 31, as plainly shown in Figs. 4 and 5. The lower end 35 of the carrying member 31 normally rests against a shoulder 36 formed on the bottom of the casing or frame 10 to limit the outward swinging movement of the switch lever 30. The carrying member 31 is preferably made U-shaped in cross section, and the closing member 32 is normally folded therein, but the back of the carrying member 31 is cut out a distance below the fulcrum 34 to allow of swinging the closing member 32 into a right-angled position relative to the carrying member 31, as shown in Fig. 6 and indicated in dotted lines in Fig. 4. It will be noticed that when the closing member 32 is swung into this angular position it moves the contact 16 into engagement with the contact 15, and the free end of the contact 16 now abuts against the inner end of the closing member 32 to hold the latter in this angular position. By reference to Fig. 4 it will be noticed that when the closing member 32 is in angular position to the back it rests on the upper edge of the back of the carrying member 31 thus limiting the swinging movement of the closing member 32. The shell 11 is provided at the sides with cut-out portions 40 to permit the user of the switch to readily press the switch lever 30 inward into the temporary circuit closing position shown in Fig. 5.

Normally the parts are in the position shown in Fig. 4 with the contacts 15 and 16 in open position. Now when the operator desires to close the electric circuit temporarily then the operator presses on the switch lever 30 to swing the same inward into the position shown in Fig. 5 whereby the upper end of the closing member 30 of the switch lever imparts an inward movement to the contact 16 to move the latter in engagement with the contact 15 and thus close the circuit. As soon as the operator releases the pressure on the switch lever 30 the spring contact 16 returns the switch lever 30 to the normal position shown in Fig. 4, at the same time moving out of engagement with the contact 15 thus breaking the circuit. Thus on alternately pressing and releasing the switch lever 30 the circuit is but temporarily closed and again opened to momentarily display a signal to a following vehicle. When it is desired to display the signal, for say several minutes or other period of time, then the operator takes hold of the lower projecting end of the closing member 32 of the switch lever 30 and swings the said closing member 32 into angular position, shown in Fig. 6 and in dotted lines in Fig. 4. It will be noticed that when the closing member 32 moves into this angular position the contact 16 is moved in engagement with the contact 15 to close the circuit, and as the pressure of the contact 16 is now exerted endwise against the closing member 32 the latter is held in an angular position with the contacts 15 and 16 closed. It will be noticed that as soon as the operator has swung the closing member 32 of the switch lever 30 into angular position, as shown and described, he can release the closing member which now stays in closed position by the pressure of the spring contact 16. When it is desired to open the circuit, the operator simply swings the closing member 32 into folded position on the carrying member 31 to allow the spring contact 16 to return to open position and thus break the circuit.

It will be noticed that when the closing member 32 of the switch lever 30 is in the angular position described and shown in Fig. 6 and in dotted lines in Fig. 4, it forms a visible means for the operator to see that the switch is closed.

Although I have shown and described the electric switch as used for controlling a vehicle signal it is evident that I do not limit myself to this particular use of the switch as the latter may be applied to other electrical devices.

Having thus described my invention, I claim as new and desire to secure by Letters Patent:—

1. An electric switch, comprising contacts normally open and a switch lever having two members movable one relative to the other, the said lever members in one position being folded and in another position being at an angle one to the other, one of the lever members being engaged by one of the said contacts, to move the contacts temporarily into closed position on pressing and releasing the lever with the members thereof in folded position, and to move the contacts into closed position for a desired length of time on moving the lever members into the said angular position.

2. An electric switch, comprising contacts normally open and a switch lever having two members, of which one is the carrying member and is pivoted on a fixed support, and the other is the switch closing member and is pivoted on the said carrying member to move bodily with the same for closing and opening the contacts on alternately pressing and releasing the switch lever, the said switch closing member being adapted to be actuated independent of the carrying member to close the contacts and hold the same closed on moving the switch closing member into angular position relative to the said carrying member and releasing the said closing member.

3. An electric switch, comprising a support, spring contacts mounted in the said support and normally open, and a switch lever having a carrying member fulcrumed on the said support and having a closing member fulcrumed on the said carrying member, the said closing member being pressed on at one end by one of the said spring contacts, the other end of the said closing member projecting beyond the fulcrum end of the said carrying member to allow of swinging the said closing member into an angular position relative to the carrying member.

4. An electric switch, comprising a support, spring contacts mounted in the said support and normally open, and a switch lever having a carrying member fulcrumed on the said support and having a closing member fulcrumed on the said carrying member, the said closing member being pressed on at one end by one of the said spring contacts, the said carrying member and the said closing member normally overlying one the other, the heel of the carrying member resting on the said support to limit the outward swinging movement of the switch lever.

5. An electric switch, comprising spring contacts normally open, and a switch lever having a pivoted carrying member and a closing member pivoted near the free end of the said carrying member and normally folded thereon to bodily move with the carrying member, the said closing member being adapted to be moved independent of the carrying member to assume an angular position thereto, the said closing member when in folded position being pressed on at the back by one of the said spring contacts, and the said closing member when in angular position being pressed on at the end by the said spring contact.

ARTHUR M. CONDIT.